J. LEDWINKA.
CRADLE FRAME FOR AUTOMOBILE BODIES.
APPLICATION FILED FEB. 25, 1913.
1,202,859.
Patented Oct. 31, 1916.
3 SHEETS—SHEET 3.
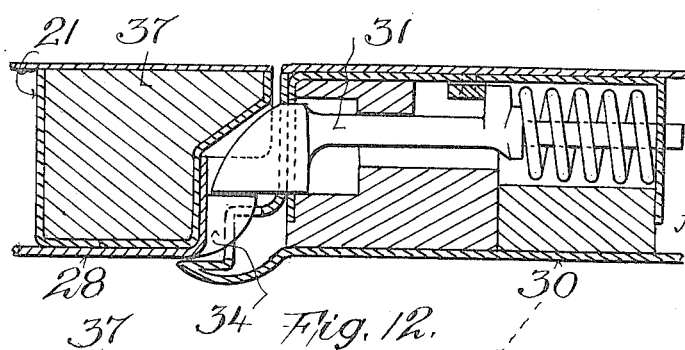
Fig. 8.
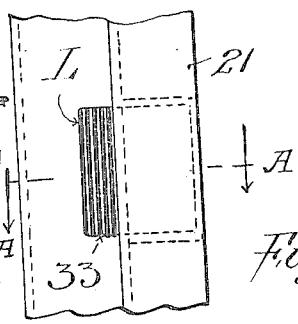
Fig. 9.
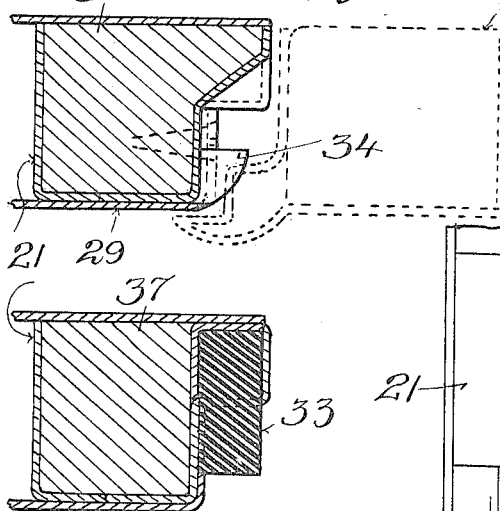
Fig. 12.
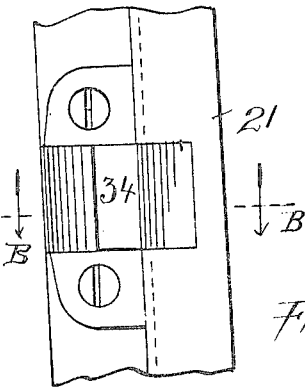
Fig. 11.
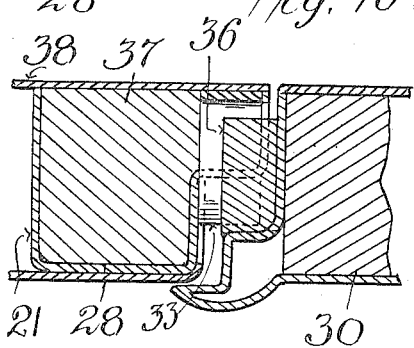
Fig. 10.
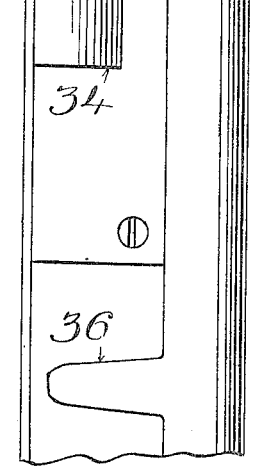
Fig. 13.
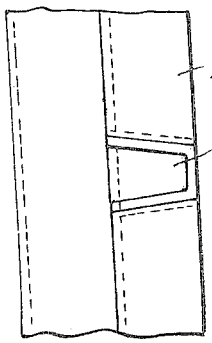
Fig. 15.
Fig. 14.
Witnesses:
Joseph Ledwinka Inventor
By his Attorney
Samuel E. Darby

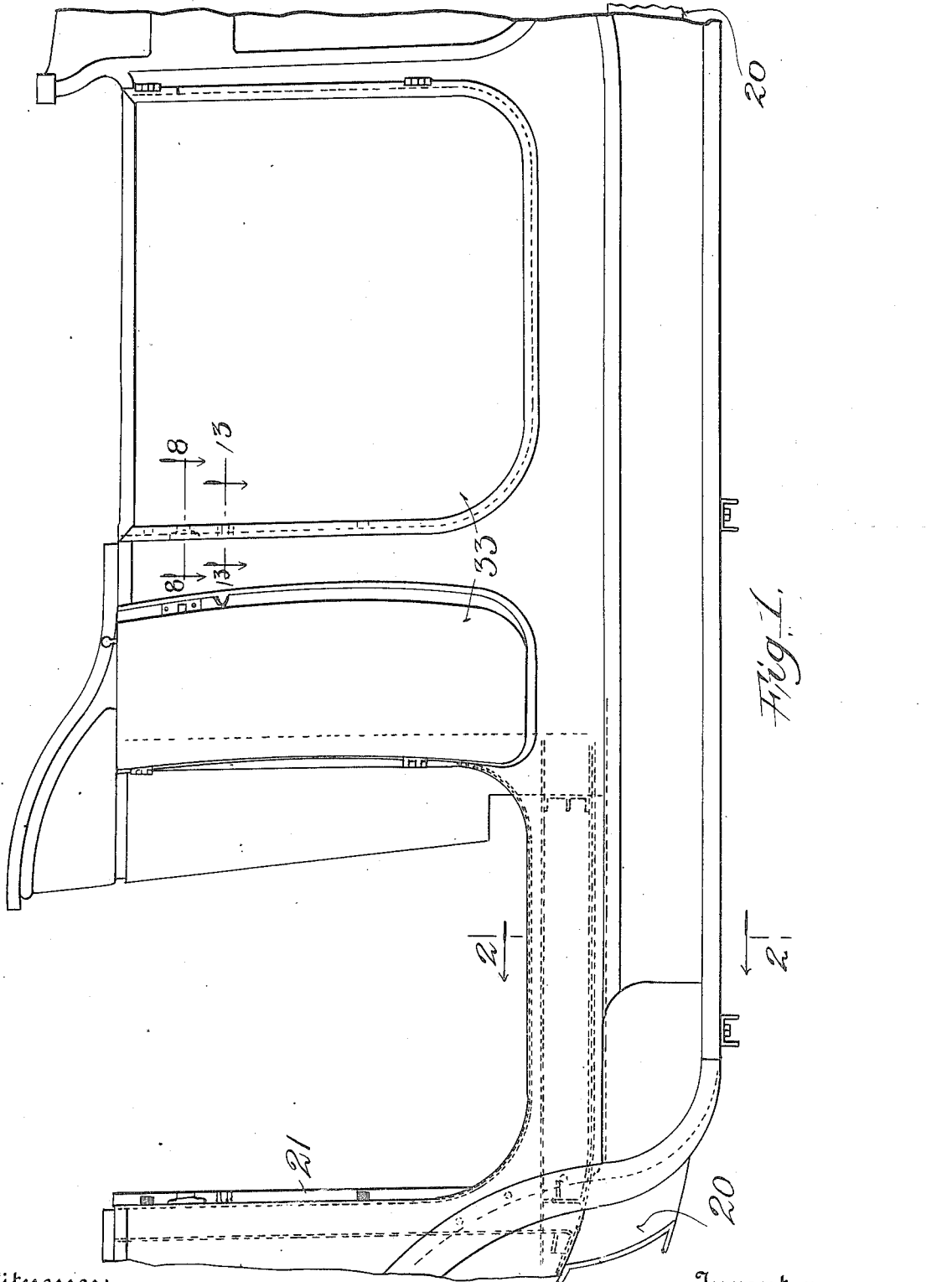

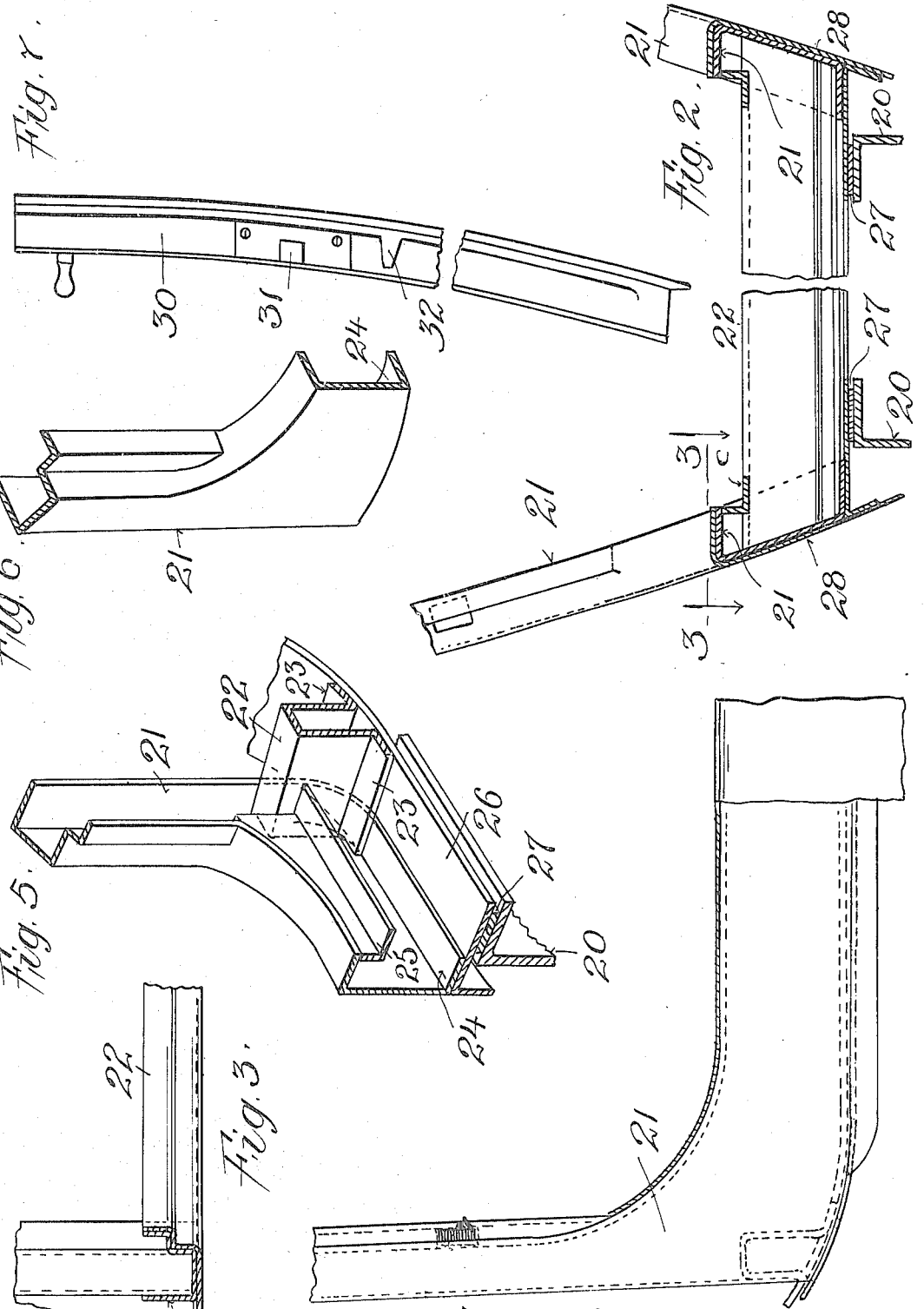

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

CRADLE-FRAME FOR AUTOMOBILE-BODIES.

1,202,859.  Specification of Letters Patent.  Patented Oct. 31, 1916.

Application filed February 25, 1913. Serial No. 750,526.

*To all whom it may concern:*

Be it known that I, JOSEPH LEDWINKA, a citizen of the United States, residing at Philadelphia, county of Philadelphia, State of Pennsylvania, have made a certain new and useful Invention in Cradle-Frames for Automobile-Bodies, of which the following is a specification.

The object of the invention is to provide a cradle frame for strengthening automobile bodies, and particularly at the door openings through automobile body sides.

A further object of the invention is to provide an automobile body cradle frame of such construction and arrangement as will permit the use of interchangeable doors of standard size.

A further object of the invention is to provide a cradle frame for the purpose stated, which is composed of a rigid structure arranged to surround or to form the border for the doorway openings at opposite sides of the automobile body, the frame on one side of the body, or at the door opening therein, being rigidly connected to the frame on the other side or at the opposite doorway, so as to produce body structures and doors of uniform size and strength.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Referring to the accompanying drawings:—Figure 1 is a view in side elevation, of an automobile body showing the application thereto of the cradle frame embodying the principles of my invention, parts of the automobile body being broken off. Fig. 2, is a broken view in section on the line 2, 2, Fig. 1, looking in the direction of the arrows. Fig. 3, is a broken detail view in section, on the line 3, 3, Fig. 2, looking in the direction of the arrows. Fig. 4 is a broken detail view in elevation, partly in section, showing a portion of the cradle frame work embodying the principles of my invention. Fig. 5 is a broken detail view in perspective, partly in section, showing a portion of the construction of cradle frame and associated parts embodying the principles of my invention. Fig. 6, is a broken detail view in perspective, showing a part of the bounding door opening frame forming part of the cradle frame of my invention. Fig. 7, is an edge view, of a door employed in connection with a cradle frame of my invention. Fig. 8, is a broken detail view in section of line 8, 8, of Fig. 1, looking in the direction of the arrows, and showing the door locking bolt in engagement with the stud or lug of the doorway frame. Fig. 9, is a broken detail edge view showing a portion of the door frame with the cushion buffer in place. Fig. 10 is a detail section on the line A, A, Fig. 9, looking in the direction of the arrows. Fig. 11 is a view similar to Fig. 9, showing another portion of the cradle frame border for the door opening of the automobile body, and the door bolt engaging lug. Fig. 12 is a broken detail view in cross section on the line B, B, Fig. 11, looking in the direction of the arrows. Fig. 13, is a broken detail view in section, on the line 13, 13, Fig. 1, looking in the direction of the arrows and showing the engagement of the door guiding lug and the doorway frame coöperating dovetail. Fig. 14 is a view similar to Figs. 9 and 11, showing an edge view of the door. Fig. 15 is a broken edge view, showing a portion of the door opening frame with the dovetail for the dove guiding lug.

The same part is designated by the same reference numeral wherever it occurs throughout the several views.

In the construction of automobile bodies it is desirable to provide a framework which is strong, durable and light. It is also important in the economical manufacture of such vehicles, to provide standard structures of interchangeable doors and other parts associated in the construction of the automobile body. In the accomplishment of these objects and purposes, among others, I propose to employ a cradle frame for the doorway openings in the sides of the automobile body so as to enable the doors to be made interchangeable and of standard size, whether for use on one side or the other of the body.

In carrying out my invention, I propose to employ a reinforced frame work around the door opening at each side of the body, and to this end I form a door post, and which surrounds the entire door opening. I also propose to connect the surrounding doorway frame or cradle on one side of the machine body integrally to the frame surrounding the opposite doorway in the other side of the body, thus forming in effect a cradle to which the outer as well as the inner panels, plates or finishing of the body of the automobile, as well as the hinges, lock, lug, rubber or other bumpers, dovetail and other features concerned in the closing, hinging, cushioning and operation of the doors are applied, all these features being formed integrally with the cradle frame.

In other words I propose to form an integral cradle structure having portions at each end thereof to form the bounding or surrounding frame work for the door openings in opposite sides of the automobile body, said cradle frames extending transversely across the automobile body, and the portions thereof which form the door jambs or posts, I propose to form of sheet steel and to press or otherwise form the same into shape to form or to receive the dovetail, the lock bolt, engaging lug, the cushion block and the like, for the doors.

In the accompanying drawings, I have shown a structure embodying the principles of my invention wherein at 20, is designated a portion of the chassis or body frame, or frame member to which the body of the automobile is designed to be secured in the usual or well known manner. The cradle member structure embodying the principles of my invention comprises the door post portions or frame indicated at 21. This is in the form of a substantially U-shaped frame or cradle and is formed from sheet steel which is pressed into channel formation and to the desired shape and configuration to form a complete border outline for the door opening in the side of the automobile body including the posts and sill for the door opening. The post border frame 21, on one side of the automobile body is integrally connected to that on the other side of the vehicle body which forms a border opening for the door opening in that side in any suitable or convenient manner. I have shown an arrangement wherein the two door posts or border portions 21, of the cradle frame, are connected together by transversely extending members 22. These transverse members should preferably be rigid and should be integrally connected to the door opening border members 21. The connection may be accomplished in any suitable or convenient manner, and the transverse rigid members 22, may have any suitable or desired shape or configuration. For lightness, strength and durability, I have shown these transverse members of the cradle frame as in the form of channels formed from sheet metal having flanges 23 which are designed to rest upon and to be welded or otherwise integrally secured to flanges or angle portions 24, of the member 21. As shown in Fig. 2, the corresponding vertical portions of the cradle frames 21 on opposite sides of the body are inclined upwardly and outwardly away from each other to conform to the general contour of the body.

From this description it will be seen that I provide a rigid frame work composed of door posts, forming a surrounding border frame structure for the door opening in each side of the automobile body, the door posts or border opening structures being integrally connected together transversely across the body of the machine, thus making a very strong, rigid, durable structure, and permitting the use of uniform standard parts, as well as the use of uniform standard interchangeable doors, in connection with the door posts. This results in the production of an exceedingly economical structure of automobile body, and this is among the desirable objects I secure in carrying out my invention into practical operation.

In order to form a support for the flooring of the automobile body, I employ an angle plate 25, which I integrally secure to the door opening cradle portion 21, by welding or otherwise, as most clearly indicated in Fig. 5. In order to close the opening outside of the chassis all around the body of the automobile, I apply an angle plate 26, as indicated in Fig. 5, and integrally secure the same by welding or otherwise to the under surface of the cradle frame portion 21, or to the flange 24 thereof as clearly shown.

If desired, and in order to avoid and reduce rattle and noise occurring through looseness or otherwise, a member composed of padding, leather, belting or the like, and indicated at 27, may be interposed between the chassis member 20 and angle plate 26. The outer shell or panel of the automobile body is indicated at 28, and is secured to the cradle frame portion 21, or rather the cradle frame portion 21 is integrally secured to the shell or casing 28, by welding or otherwise, as may be desired.

One of the important advantages attained in the use of a cradle frame embodying the principles of my invention, is the use of uniform standard size interchangeable doors. A door adapted for use in connection with my invention is indicated at 30. It is usual to equip the edge of the door with locking bolts, indicated at 31, and with dovetail guiding projections or lugs, indicated at 36, for the purpose of drawing the same tight into its seat when closed. It is also usual to provide rubber or other form of cushion buffers, indicated at 33, for the purpose of cushioning the doors when slammed to their closed position. The provision of the door post members of the cradle portion 21, which surrounds the door opening and constructed as above described enables me to provide the lug or other engaging device for the lock 31, of the door, and also the coöperating dovetail socket or seat portion 35, which coöperates with the dovetailing lug 36, on the door and also to provide a seat for accommodating the rubber buffer 33, in the door jamb. To this end, I suitably shape the edge of the door post portion or member 21, so as to receive the locking bolt engaging lug or projection 34, (see Figs. 8 and 12) as well as to form the seat 35, to receive the dovetail 36 of the door, this seat 35, being shown in Fig. 15, for use in connection with the dovetail lug or projection 36 on the door, as shown in Figs. 13 and 14. The various parts or members 34, 33 and 35, are formed in or carried by the door jamb, or in seat therefor formed in said jamb, and the use of sheet steel for the purpose of forming the door jamb enables me to form the seats as above described, or to press the same into suitable shape to form the members or seats as above indicated, thus enabling me to secure a strong, durable, most efficient and uniform standard structure. If desired a wood filler portion 37 may be employed within the door post section 21, to afford a stiffening backing therefor, as clearly indicated in Figs. 8, 10, 12, and 13, and to afford means for attaching thereto the inner and outer panels 38 and 28, respectively of the body.

Having now set forth the objects and nature of my invention, and a construction embodying the principles thereof, what I claim as new and useful, and of my own invention, and desire to secure by Letters Patent, is:—

1. A cradle frame for automobile bodies consisting of end portions and cross connecting portions integrally secured together into a single rigid unitary structure, the end portions being formed of sheet metal and into substantially U-shape having vertical portions formed into channel shape to constitute door posts in the sides of the automobile body.

2. A cradle frame for automobile bodies consisting of end portions each formed of sheet metal bent into substantially U-shape to form vertical door posts and door sills for the automobile body sides, and having a channel formation in transverse section, and a channel shaped cross connecting member having flanges and integrally secured at its ends to the end portions to form a single, rigid unitary structure.

3. A cradle frame for automobile bodies consisting of end portions each formed of sheet metal bent into substantially U-shape to form vertical door posts for the automobile body sides, and having a channel formation in transverse section, one leg of each U-shaped portion having lugs and seats formed therein, and a channel shaped cross connecting member having flanges and integrally connected at its ends to the end portions, to form a single rigid unitary structure.

4. A cradle frame for automobile bodies consisting of end portions each formed of sheet metal bent into substantially U-shape to form vertical door posts and a horizontal door sill for the automobile body sides, and having a channel formation in transverse section, a flanged floor supporting member integrally connected to the base of each U-shaped end portion, and a channel shaped cross connecting member having flanges and integrally connected at its ends to the end portions to form a single rigid unitary structure.

5. A cradle frame for automobile bodies consisting of end portions each formed of sheet metal bent into substantially U-shape to form vertical door posts and a door sill for the automobile body sides, and having a channel formation in transverse section, a flanged cover plate resting in the chassis frame of the body and integrally secured to the base portions of the U-shaped end portions, and a channel shaped cross connecting member having flanges and integrally connected at its ends to the end portions to form a single rigid unitary structure.

In testimony whereof I have hereunto set my hand in the presence of the subscribing witnesses, on this 14th day of February A. D., 1913.

JOSEPH LEDWINKA.

Witnesses:
S. K. THOMPSON,
J. MARMION.